2,697,659

TREATMENT OF ALKALINE WASTE WATERS

Walter H. MacIntire, Knoxville, Tenn., assignor to The University of Tennessee Research Corporation, Knoxville, Tenn., a corporation of Tennessee No Drawing. Application May 5, 1950,
Serial No. 160,397

7 Claims. (Cl. 71—25)

This invention relates to the clarification of alkaline waste waters resultant from the digestion of pulpwood and other materials in the manufacture of paper and to the concomitant production of useful products.

In the alkaline digestion of cellulosic paper-making materials, the waste liquor remaining after the cellulosic pulp has been separated comprises a hot solution of sodium hydroxide and/or carbonate, discolored by the presence of dissolved and suspended organic materials. In the case of wood pulp, for example, the materials extracted from the wood may amount to a substantial fraction of the starting woody material.

The disposal of such alkaline colored effluent waste waters presents a serious problem. Often the nearby streams are not large enough to admit of their reception of waste waters without resultant detrimental effects upon the fauna of the streams and upon the various uses of stream waters in domestic life and in manufacturing operations. Moreover, in many localities discharge of such waste waters into streams is forbidden by law. Furthermore, the alkalinity of the effluent waters precludes their disposal through discharges into ponds, because the alkali solutes render the subsoil virtually impervious to gravitational drainage and hence concentration is effected only by virtue of normal surface evaporation. On the other hand, the concentration of the waste water through thermally-induced evaporation followed by sub-combustion of the effluents to utilize potential fuel values and to recover additive alkali solids is an expensive procedure.

The present invention provides for the neutralization of such waste waters and at the same time effects discoloration and clarification thereof through the removal of the dissolved and suspended organic matter. These objectives are accomplished in a simple and relatively inexpensive manner, with resultant diminution in disposal problems and attendant conservation of a large fraction of the extracted organic matter, inherent to the starting material, through its inclusion in the precipitates mentioned hereinafter.

The foregoing objectives are accomplished through the addition to the waste water of a quantity of an acidic superphosphate fertilizer and a supplement of calcium chloride sufficient jointly to engender an equivalent quantity of dibasic calcium phosphate, the quantity of these materials to be added preferably being virtually that, or substantially that necessary to neutralize the alkalinity of the waste waters. Superphosphates are manufactured by well known processes in which rock is acidulated with either sulfuric acid or phosphoric acid, as indicated by the equation $$3Ca_3(PO_4)_2 \cdot CaF_2 + 7H_2SO_4 \rightarrow 7CaSO_4 + 3Ca(H_2PO_4)_2 + 2HF$$

for the production of "standard" superphosphate and by the equation $$3Ca_3(PO_4)_2 \cdot CaF_2 + 14H_3PO_4 \rightarrow 10Ca(H_2PO_4)_2 + 2HF$$

for the production of concentrated superphosphate referred to as either "double," "triple," or "treble." These superphosphates have as a common major ingredient the monobasic calcium phosphates $Ca(H_2PO_4)_2$, which is the active acidic ingredient in those processes that comprise the present invention. Both superphosphates also contain most of the fluorine carried by the phosphate rock. They differ mainly in that ordinary superphosphate is diluted by about 45 per cent content of calcium sulfate, whereas the concentrated superphosphate is almost devoid of calcium sulfate and thus has a considerably higher content of $P_2O_5$.

When superphosphate, appropriately accompanied by additive $CaCl_2$, is added to the alkaline waste liquor in suitable amounts, its chief ingredient (monobasic calcium phosphate) reacts with the sodium solutes (sodium hydroxide and sodium carbonate), with resultant development of water-insoluble dibasic calcium phosphate, which is citrate-soluble and therefore an effective fertilizer compound. The reaction is indicated by the equation $$Ca(H_2PO_4)_2 + CaCl_2 + 2NaOH \rightarrow 2CaHPO_4 + 2NaCl + 2H_2O$$

The engendered precipitate of dibasic calcium phosphate is finely divided and serves to occlude the suspended organic matter, so that the waste liquor can be decolorized and clarified through separation of the precipitated material in any suitable manner, with resultant full recovery of the additive phosphate in solid form. The neutralized clear solution then can be discharged into ponds or streams or suitably disposed or otherwise.

The separated precipitate and occluded matter can be dried in any suitable manner to provide a product that has a high degree of fertilizer value because of its content of dicalcium phosphate and organic matter. The product resultant from the use of ordinary superphosphate contains calcium sulfate, a material that has fertilized value because of the nutrient value of its sulfur content in particular.

The quantity of sodium solutes present in the waste water may be known through experience or determined by means of any suitable chemical procedure, and the addition of superphosphate should be sufficient to neutralize the sodium solutes, because an excess of sodium in alkaline combination will cause an increase in the quantity of sodium phosphate remaining as a solute in the liquor subsequent to the separation of the precipitated material and thus result in a dissipation of the additive phosphate. No advantage ensues when the superphosphate additions serve to supply monobasic calcium phosphate in quantities beyond those requisite to neutralize the alkalinity of the effluent waters, since a large part of the phosphate ion would remain in the waste water. The quantities of $CaCl_2$ and superphosphate to be added thus are governed by the content of monobasic calcium phosphate and/or "free" $H_3PO_4$, and by the quantity of alkaline sodium solutes in the waste liquor. Preferably, these quantities should be adjusted according to the molar proportions of the basic and acidic reactants. Upon completion of the precipitation, the liquor should be slightly alkaline to assure the full recovery of the additive $PO_4$ as dibasic calcium phosphate.

The reaction may be carried out immediately after the pulp-digestion process is completed and while the liquor is still hot, or after a period of cooling of the liquor, according to the facilities available at particular plants. In case larger particle size of the engendered dicalcium phosphate is desired, reaction in the hot is preferable, whereas finer particle size can be produced through slower precipitation in the cold. The superphosphate and calcium chloride can be added separately in either sequence, but it is preferable to add the highly soluble chloride first. In some cases it may be advantageous to add the two reactants to the hot effluent waters simultaneously at a given rate. Any of these procedures, or equivalent procedures, can be used according to the choice of the operator in each case.

The precipitate and occluded material can be separated from the waste liquor in any desired manner, as by sedimentation and the syphoning off of the clarified supernatant, or more expeditiously by filtration either through suction or pressure or by means of centrifugation. The separated moist material then can be dried rapidly and inexpensively in any desired manner without undue elevation in temperature. Drying at low temperature under reduced pressure is preferred, especially when standard superphosphate is used in the process.

Reference is made to applicant's copending application Serial No. 160,396, filed May 5, 1950, entitled "Treatment of Alkaline Waste Waters."

It will be understood that the details of the foregoing description are set forth for purposes of illustration only and that various changes therein can be made by those skilled in the art without departing from the spirit of the invention. Therefore reference should be had to the appended claims for a definition of the limits of the invention.

What is claimed is:

1. A process for the treatment of the waste waters that result from the digestion of cellulosic papermaking materials and containing alkaline compounds and organic matter, which comprises the addition of calcium chloride and superphosphate to said waste water to form therein dibasic calcium phosphate in the presence of suspended organic matter and to co-precipitate said calcium phosphate and organic matter, and then separating the precipitate and occluded organic matter from the thus clarified waste water.

2. A process as defined in claim 1 wherein the precipitate and occluded matter are recovered jointly and dried.

3. A process as defined in claim 1, the said $CaCl_2$ and the superphosphate being added to the waste liquor in quantities such that the two additives and the alkaline content of the waste water are in approximately molar proportions for the formation of dibasic calcium phosphate.

4. A process as defined in claim 1 wherein the superphosphate is concentrated superphosphate substantially devoid of calcium sulfate.

5. A process as defined in claim 4 wherein the precipitate and occluded matter are recovered jointly and dried.

6. A process as defined in claim 1 wherein the superphosphate is standard superphosphate containing calcium sulfate, said precipitate comprising dibasic calcium phosphate and calcium sulfate together with occluded organic matter.

7. A process as defined in claim 6 wherein the precipitate and occluded matter are recovered jointly and dried.

References Cited in the file of this patent

UNITED STATES PATENTS

| Number | Name | Date |
|---|---|---|
| 1,779,226 | Bradley | Oct. 21, 1930 |
| 1,788,952 | Holz | Jan. 13, 1931 |
| 1,799,176 | Metzl | Apr. 7, 1931 |
| 1,933,445 | Murdock | Oct. 31, 1933 |